United States Patent
Corr et al.

(10) Patent No.: US 9,547,810 B2
(45) Date of Patent: Jan. 17, 2017

(54) RENDERING AND OUTPUTTING NON-STANDARD COLORANT

(71) Applicants: KABUSHIKI KAISHA TOSHIBA, Tokyo (JP); TOSHIBA TEC KABUSHIKI KAISHA, Tokyo (JP)

(72) Inventors: Martin E. Corr, Hunters Hill (AU); Chaminda Weerasinghe, Bella Vista (AU); Hugh J. Wilcox, Drummoyne (AU)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/677,813

(22) Filed: Apr. 2, 2015

(65) Prior Publication Data

US 2016/0292549 A1   Oct. 6, 2016

(51) Int. Cl.
  *H04N 1/40* (2006.01)
  *G06K 15/02* (2006.01)
  *H04N 1/60* (2006.01)

(52) U.S. Cl.
  CPC ....... *G06K 15/1878* (2013.01); *G06K 15/1813* (2013.01); *G06K 15/1817* (2013.01); *G06K 15/1897* (2013.01); *G06K 2215/0094* (2013.01); *G06K 2215/111* (2013.01)

(58) Field of Classification Search
  CPC ............ G06K 15/1878; G06K 15/1813; G06K 15/1817; G06K 15/1897; G06K 2215/0094; G06K 2215/111
  USPC ....... 358/3.01, 1.9, 2.1, 500–504, 3.24, 1.15
  See application file for complete search history.

(56) References Cited

U.S. PATENT DOCUMENTS

| | | | | |
|---|---|---|---|---|
| 5,999,710 A | * | 12/1999 | Smith | G06K 15/12 358/1.13 |
| 8,002,376 B2 | | 8/2011 | Kakutani | |
| 8,041,264 B2 | | 10/2011 | Suchy et al. | |
| 8,444,243 B2 | | 5/2013 | Kakutani | |
| 8,529,043 B2 | * | 9/2013 | Kakutani | B41J 2/14201 347/100 |

(Continued)

FOREIGN PATENT DOCUMENTS

JP    5617427    9/2014

*Primary Examiner* — Quang N Vo
(74) *Attorney, Agent, or Firm* — SoCal IP Law Group LLP; Steven C. Sereboff; Jonathan P. Pearce (57) ABSTRACT

A system for rendering and outputting a non-standard colorant comprises a print driver for accepting identification of a document for output via a print operation, accepting identification of overlay data for use in the print operation, converting the overlay data into grayscale data, and generating a page description language document including data from the document divided into standard colorspace channels and an overlay colorspace channel, the overlay channels made up of the grayscale data and identified by a colorspace keyword; and a multifunction peripheral device for rendering the standard channels in standard buffers as directed by the page description language document, identifying the overlay channels using the color name keyword within the page description language document, rendering the overlay channel in an overlay buffer, and completing the print operation by outputting the contents of the standard buffers using standard colorants and the overlay buffer using an overlay colorant.

20 Claims, 11 Drawing Sheets

(56) References Cited

U.S. PATENT DOCUMENTS 8,728,696 B2  5/2014  Yamada et al.
9,070,076 B1 * 6/2015  Smith ................ G06K 15/1878

* cited by examiner

Demonstration
of Using
Decorative Toner
from the
Fifth Channel for
Printing

FIG. 8

| Basic | Finishing | Paper | Image | Effect | Others | Template |

Print Job Type — 910

Normal Print ▶

Demonstration
of Using
Decorative Toner
from the
Fifth Channel for
Printing

— 920

Watermark

None ▶

Overlay Image — 930

Overlay_File ▶

☐ Print Over the Document
☐ Print on Each Page
☒ Metallic Print — 940
☐ Rotate 180 Degrees
☐ Mirror
☐ Negative/Positive Security Pattern None ▶

Profile

Default ▶

[ OK ]  [ Cancel ]  [ Help ]

RENDERING AND OUTPUTTING NON-STANDARD COLORANT

BACKGROUND

Field

This disclosure relates to a system and method for rendering and outputting non-standard colorant.

Description of the Related Art

A multifunction peripheral (MFP) is a type of document processing device which is an integrated device providing at least two document processing functions, such as print, copy, scan and fax. In a document processing function, an input document (electronic or physical) is used to automatically produce a new output document (electronic or physical).

Documents may be physically or logically divided into pages. A physical document is paper or other physical media bearing information which is readable unaided by the typical human eye. An electronic document is any electronic media content (other than a computer program or a system file) that is intended to be used in either an electronic form or as printed output. Electronic documents may consist of a single data file, or an associated collection of data files which together are a unitary whole. Electronic documents will be referred to further herein as documents, unless the context requires some discussion of physical documents which will be referred to by that name specifically.

In printing, the MFP automatically produces a physical document from an electronic document. In copying, the MFP automatically produces a physical document from a physical document. In scanning, the MFP automatically produces an electronic document from a physical document. In faxing, the MFP automatically transmits via fax an electronic document from an input physical document which the MFP has also scanned or from an input electronic document which the MFP has converted to a fax format.

MFPs are often incorporated into corporate or other organization's networks which also include various other workstations, servers and peripherals. An MFP may provide remote document processing services to external or network devices.

MFPs may be used to output colorant in a series of colorspace channels. This process involves a print driver that receives input (typically in the form of a document or image file) that includes colors. The colors may be generated using a number of base colors, but the most common colorspace is CMYK (which stands for Cyan, Magenta, Yellow, and Key (or black)). Other colorspace examples include RGB (red, green, blue), CcMmYK (two shades of cyan, two shades of magenta, yellow and key (black)). To do so, the desired colors are processed by the print driver into independent color channels which, when printed one-after-another will generate the desired tones. For example, cyan and yellow, in various densities, when combined will generate colors from a deep blue, to an aquamarine, to a green, to a sickly yellow and anything in between when printed on a white page.

This is typically implemented in a system whereby individual channel buffers are used for each of the colors in a colorspace. These channel buffers are filled with data pertaining to the amount and location of each color to be applied on a printed page. When combined in appropriate levels, the desired image appears on the resulting printed document.

Throughout this description, elements appearing in figures are assigned three-digit reference designators, where the most significant digit is the figure number where the element is introduced, and the two least significant digits are specific to the element. An element that is not described in conjunction with a figure may be presumed to have the same characteristics and function as a previously-described element having the same reference designator.

DETAILED DESCRIPTION

Printing using non-standard toners or colorants typically requires special printing equipment. For example, purpose-made printers may enable the printing of metallic or other, decorative colorants that typical MFPs are incapable of handling. Some higher-end graphics and printing software enable management of specialized ink or toner, but the hardware to enable this capability is expensive and in very limited use by individuals or companies other than specialized print services.

Description of Apparatus

Figure 1:
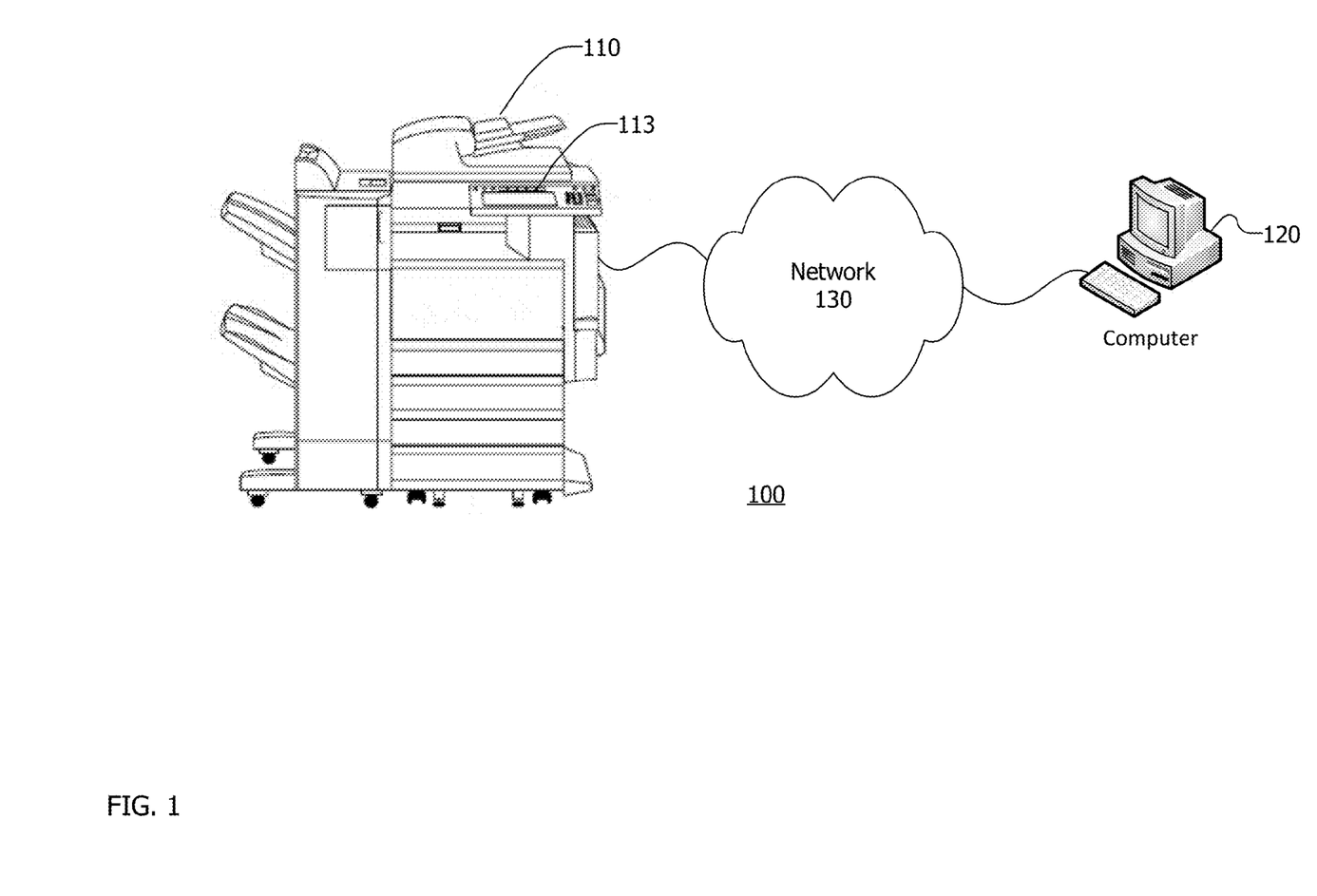
FIG. 1 is a diagram of a system.

Referring now to FIG. 1, a system 100 may include a document processing device 110 and a computer 120 connected by a network 130. A system 100 may include more than one document processing device 110 and more than one computing device 120.

The document processing device 110 may be configured to provide one or more document processing operations such as printing, copying, scanning and faxing. The document processing device 110 may be, as shown, a MFP capable of performing two or more document processing operations. A user interface 113 may be or include physical buttons, a capacitive or physically-reactive display including interactive visual elements generated by software.

Figure 3:
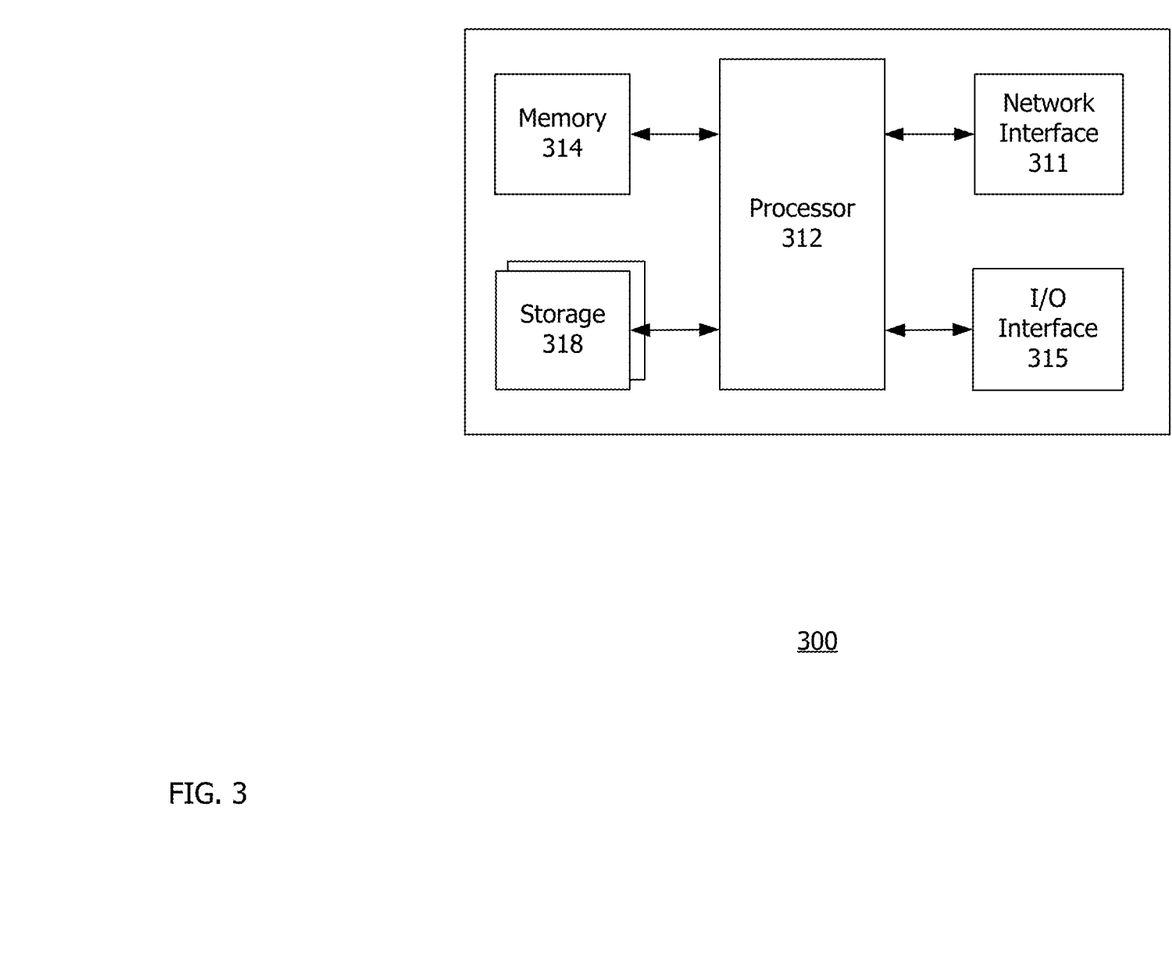
FIG. 3 is a block diagram of a computing device.

The computer 120 is computing device (as shown in FIG. 3) that utilizes software to access and/or create documents for transmission to the document processing device 110, via the network 130. The computer 120 includes software operating on a computing device. The computer 120 may include print driver software. The computer 120 may include print driver software, portable document format writing software, in addition to application software for generating, viewing, editing or accessing files of various types. The computer may be a traditional desktop or laptop computer, but may also take the form of a mobile device, a smart phone, a tablet or other, similar computing devices.

The network 130 may be or include a local area network, a wide area network, a personal area network, a mobile or telephone network, the Internet, an intranet, or any combination of these. The network 130 may have physical layers and transport layers according to IEEE 802.11, Ethernet or other wireless or wire-based communication standards and protocols such as WiMAX®, Bluetooth®, mobile telephone and data protocols, the public switched telephone network, a proprietary communications network, infrared, and optical.

Figure 2:
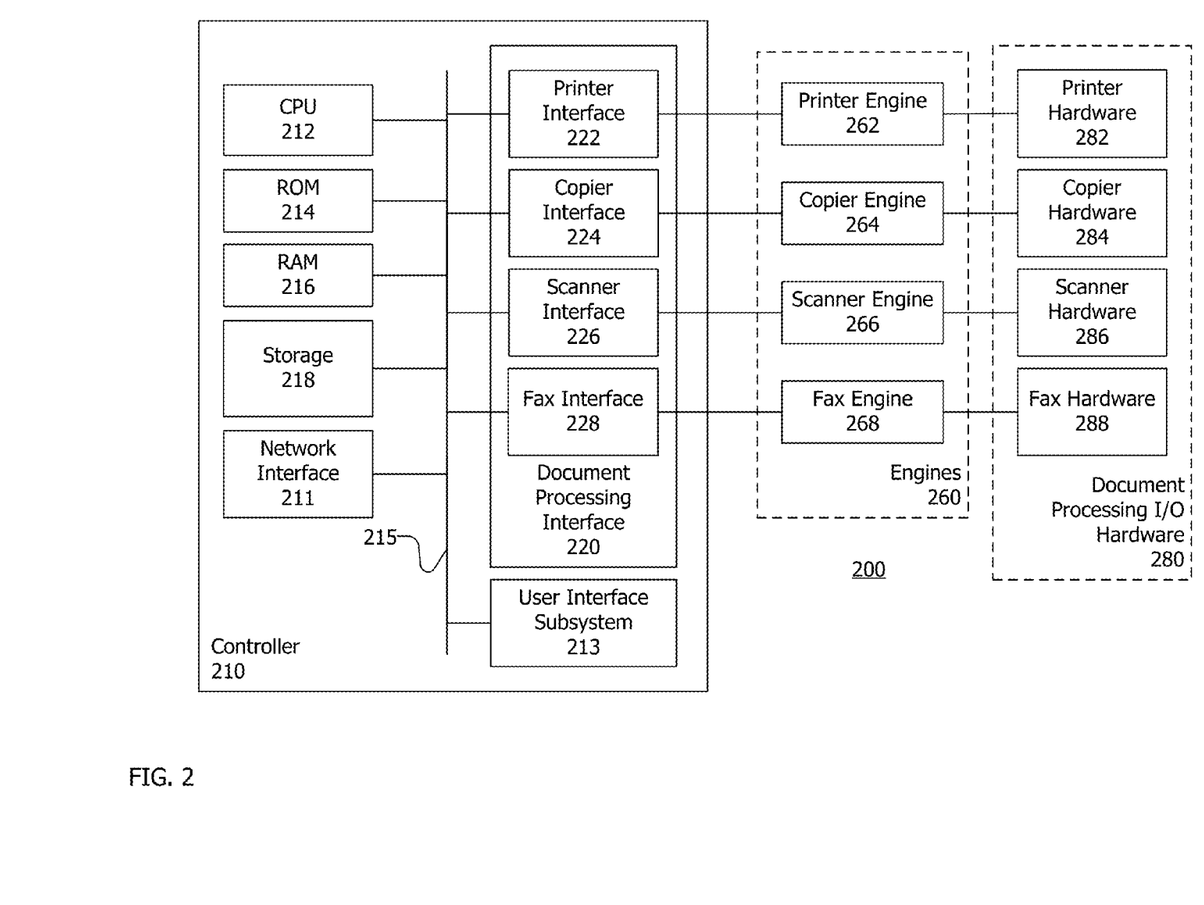
FIG. 2 is a block diagram of a MFP.

FIG. 2 is a block diagram of an MFP 200 which may be the document processing device 110. The MFP 200 includes a controller 210, engines 260 and document processing I/O hardware 280. The controller 210 includes a CPU 212, a ROM 214, a RAM 216, a storage 218, a network interface 211, a bus 215, a user interface subsystem 213 and a document processing interface 220.

As shown in FIG. 2 there are corresponding components within the document processing interface 220, the engines 260 and the document processing I/O hardware 280, and the components are respectively communicative with one another. The document processing interface 220 has a printer interface 222, a copier interface 224, a scanner interface 226 and a fax interface 228. The engines 260 include a printer engine 262, a copier engine 264, a scanner engine 266 and a fax engine 268. The document processing I/O hardware 280 includes printer hardware 282, copier hardware 284, scanner hardware 286 and fax hardware 288.

The MFP 200 is configured for printing, copying, scanning and faxing. However, an MFP may be configured to provide other document processing functions, and, as per the definition, as few as two document processing functions.

The CPU 212 may be a central processor unit or multiple processors working in concert with one another. The CPU 212 carries out the operations necessary to implement the functions provided by the MFP 200. The processing of the CPU 212 may be performed by a remote processor or distributed processor or processors available to the MFP 200. For example, some or all of the functions provided by the MFP 200 may be performed by a server or thin client associated with the MFP 200, and these devices may utilize local resources (e.g., RAM), remote resources (e.g., bulk storage), and resources shared with the MFP 200.

The ROM 214 provides non-volatile storage and may be used for static or fixed data or instructions, such as BIOS functions, system functions, system configuration data, and other routines or data used for operation of the MFP 200.

The RAM 216 may be DRAM, SRAM or other addressable memory, and may be used as a storage area for data instructions associated with applications and data handling by the CPU 212.

The storage 218 provides volatile, bulk or long term storage of data associated with the MFP 200, and may be or include disk, optical, tape or solid state. The three storage components, ROM 214, RAM 216 and storage 218 may be combined or distributed in other ways, and may be implemented through SAN, NAS, cloud or other storage systems.

The network interface 211 interfaces the MFP 200 to a network, such as the network 122 (FIG. 1), allowing the MFP 200 to communicate with other devices.

The bus 215 enables data communication between devices and systems within the MFP 200. The bus 215 may conform to the PCI Express or other bus standard.

While in operation, the MFP 200 may operate substantially autonomously. However, the MFP 200 may be controlled from and provide output to the user interface subsystem 213.

The document processing interface 220 may be capable of handling multiple types of document processing operations and therefore may incorporate a plurality of interfaces 222, 224, 226 and 228. The printer interface 222, copier interface 224, scanner interface 226, and fax interface 228 are examples of document processing interfaces. The interfaces 222, 224, 226 and 228 may be software or firmware.

Each of the printer engine 262, copier engine 264, scanner engine 266 and fax engine 268 interact with associated printer hardware 282, copier hardware 284, scanner hardware 286 and facsimile hardware 288, respectively, in order to complete the respective document processing functions. The printer hardware 282 may include printing hardware (e.g. print colorant or toner, colorant reservoirs, print rollers, memory sufficient to store data pertaining to, data in memory or buffers, and other printer hardware) for a traditional colorspace such as CMYK or CcMmYK in addition to at least one overlay colorant. As used herein, those colorants, buffers, print rollers, memory, data in memory or buffers, and other printer hardware associated with a standard colorspace, such as CMYK or CcMmYK, are referred to as "standard" or "traditional", whereas toner, colorants, buffers, print rollers, memory, data in memory or buffers, and other printer hardware associated with the overlay colorant are referred to as "non-standard", "alternative", or "overlay."

Each of the overlay printer hardware elements are provided in addition to those used for those associated with a standard colorspace. So, for example, four buffers, print rollers, colorant reservoirs, memory, and other printer hardware are provided for the CMYK colorspace. In addition, in the present system, a fifth set of identical hardware (or similar, print rollers and colorant reservoirs may, for example, be different in order to accommodate special colorants) may be provided for each overlay colorant.

Turning now to FIG. 3, a computing device 300 may be representative of the server computers, client devices, mobile devices and other computing devices discussed herein. The controller 210 of FIG. 2 may also incorporate, in whole or in part, a general purpose computer like the computing device 300. The computing device 300 may include software and/or hardware for providing functionality and features described herein. The computing device 300 may therefore include one or more of: logic arrays, memories, analog circuits, digital circuits, software, firmware and processors. The hardware and firmware components of the computing device 300 may include various specialized units, circuits, software and interfaces for providing the functionality and features described herein.

The computing device 300 may have a processor 312 coupled to a memory 314, storage 318, a network interface 311 and an I/O interface 315. The processor may be or include one or more microprocessors and application specific integrated circuits (ASICs).

The memory 314 may be or include RAM, ROM, DRAM, SRAM and MRAM, and may include firmware, such as static data or fixed instructions, BIOS, system functions, configuration data, and other routines used during the operation of the computing device 300 and processor 312. The memory 314 also provides a storage area for data and instructions associated with applications and data handled by the processor 312.

The storage 318 may provide non-volatile, bulk or long term storage of data or instructions in the computing device 300. The storage 318 may take the form of a disk, tape, CD, DVD, or other reasonably high capacity addressable or serial storage medium. Multiple storage devices may be provided or available to the computing device 300. Some of these storage devices may be external to the computing device 300, such as network storage or cloud-based storage.

The network interface 311 may be configured to interface to a network such as network 122 (FIG. 1).

The I/O interface 315 may be configured to interface the processor 312 to peripherals (not shown) such as displays, keyboards and USB devices.

Figure 4:
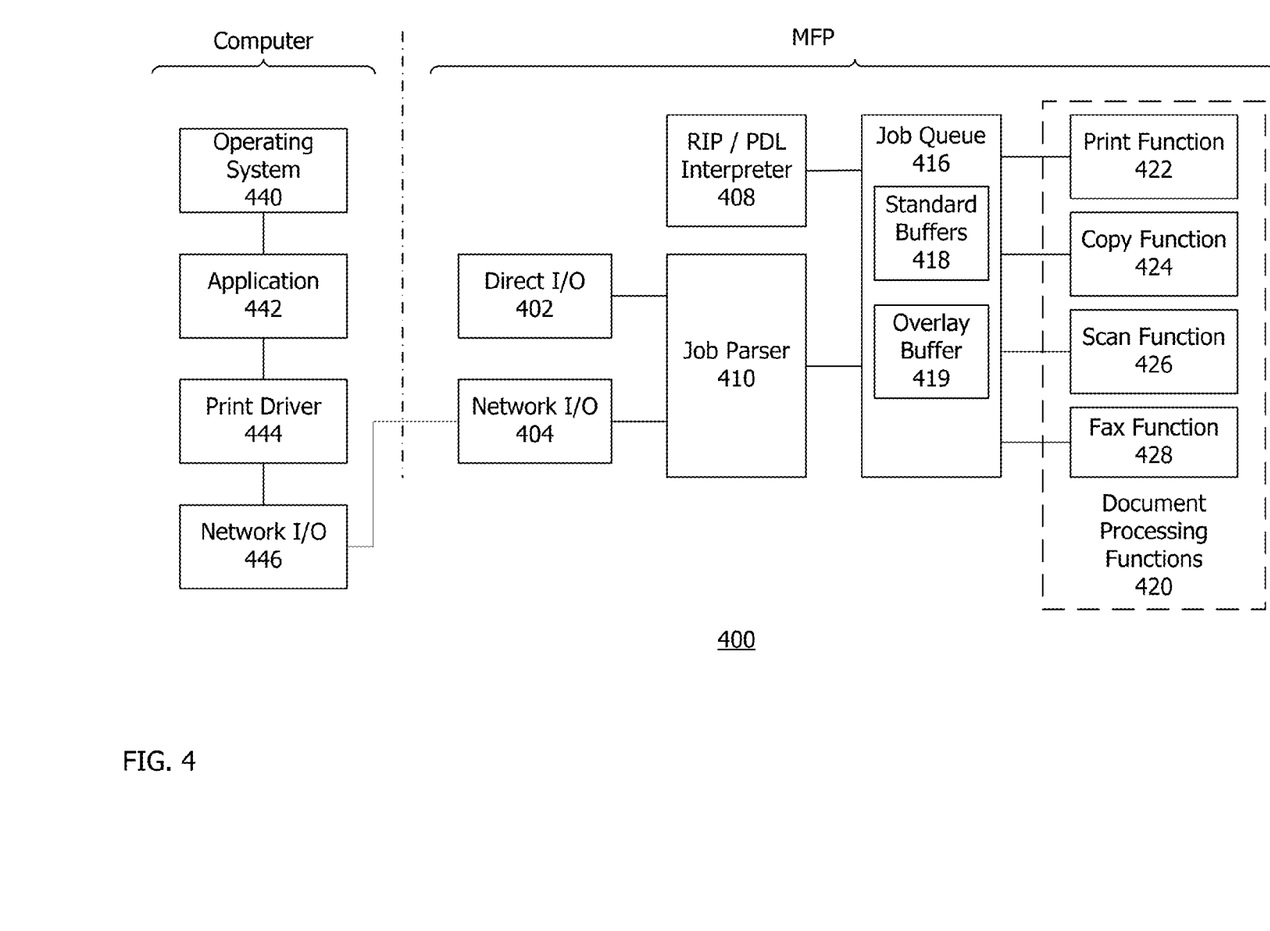
FIG. 4 is a block diagram of a software system for an MFP and a computer.

FIG. 4 is a block diagram of a software system 400 for an MFP, which may be the document processing device 110 of FIG. 1, and a computer, which may be the computer 120 of FIG. 1.

The portion of the software system 400 within the MFP may operate, for example, on the controller 210 of the MFP 200. The portion of the software system 400 within the MFP may include client direct I/O 402, client network I/O 404, a RIP/PDL interpreter 408, a job parser 410, a job queue 416, a series of document processing functions 420 including a print function 422, a copy function 424, a scan function 426 and a fax function 428.

The client direct I/O 402 and the client network I/O 404 may provide input and output to the MFP controller. The client direct I/O 402 is for the user interface on the MFP, and the client network I/O 404 is for user interfaces over the network. This input and output may include documents for printing or faxing or parameters for MFP functions. In addition, the input and output may include control of other operations of the MFP. The network-based access via the client network I/O 404 may be accomplished using HTTP (hypertext transfer protocol), FTP (file transfer protocol), UDP (user datagram protocol), TCP (transmission control protocol), electronic mail, TELNET or other network communication protocols.

The RIP/PDL (Raster Image Processor/Page Description Language) interpreter 408 may transform PDL-encoded documents received by the MFP into raster images or other forms suitable for use in MFP functions and output by the MFP. The RIP/PDL interpreter 408 processes the document and adds the resulting output to the job queue 416 to be output by the MFP.

The job parser 410 interprets a received document and relays it to the job queue 416 for handling by the MFP. The job parser 410 may perform functions of interpreting data received so as to distinguish requests for operations from documents and operational parameters or other elements of a document processing request.

The job queue 416 stores a series of jobs for completion using the document processing functions 420. Various image forms, such as bitmap, page description language or vector format may be relayed to the job queue 416 from the scan function 426 for handling. The job queue 416 is a temporary repository for all document processing operations requested by a user, whether those operations are received via the job parser 410, the client direct I/O 402 or the client network I/O 404.

The job queue 416 may include or have access to memory for storing one or more buffers such as standard buffers 418 for a standard CMYK or CcMmYK colorspace and one or more overlay buffers, such as overlay buffer 419, for non-standard colorants. Documents to be printed may be split into colorspace channels and stored within these standard buffers 418 and overlay buffer 419 before output by the MFP.

The job queue 416 and associated software is responsible for determining the order in which print, copy, scan and facsimile functions are carried out. These may be executed in the order in which they are received, or may be influenced by the user, instructions received along with the various jobs or in other ways so as to be executed in different orders or in sequential or simultaneous steps. Information such as job control, status data, or electronic document data may be exchanged between the job queue 416 and users or external reporting systems.

The job queue 416 may also communicate with the job parser 410 in order to receive PDL files from the client direct I/O 402. The client direct I/O 402 may include printing, fax transmission or other input of a document for handling by the software system 400.

The print function 422 enables the MFP to print documents and implements each of the various functions related to that process. These include stapling, collating, hole punching, and similar functions. The copy function 424 enables the MFP to perform copy operations and all related functions such as multiple copies, collating, 2 to 1 page copying or 1 to 2 page copying and similar functions. Similarly, the scan function 426 enables the MFP to scan and to perform all related functions such as shrinking scanned documents, storing the documents on a network or emailing those documents to an email address. The fax function 428 enables the MFP to perform facsimile operations and all related functions such as multiple number fax or auto-redial or network-enabled facsimile.

Some or all of the document processing functions 420 may be implemented on a client computer, such as a personal computer or thin client. The user interface for some or all document processing functions may be provided locally by the MFP's user interface subsystem though the document processing function is executed by a computing device separate from but associated with the MFP.

The computer may include an operating system 440, an application 442, a print driver 444 and network I/O 446. The operating system 440 runs as a base level of software to enable other applications and drivers to operate thereupon. The application 442 may be one or more applications such as a word processing application or image editor. The application 442 may have access to one or more print drivers, such as print driver 444, for converting files (such as documents and image files) into page description language or postscript documents suitable for printing or other output by an MFP. The network I/O 446 of the computer may be a part of the operating system or operate separately. The network I/O 446 is used to transmit data converted by the computer to the MFP for document processing operations, such as printing, to be performed thereon.

Description of Processes

Figure 5:
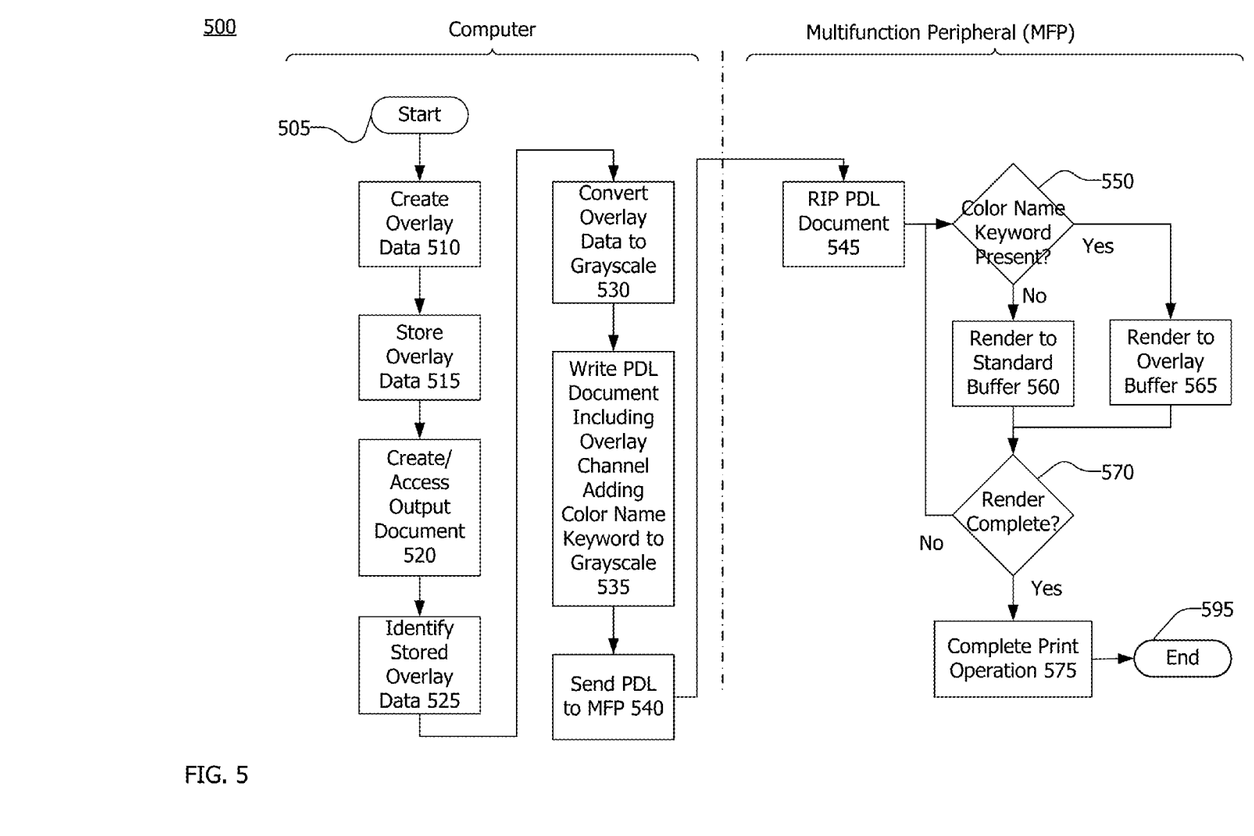
FIG. 5 is a flowchart of process for applying non-standard colorants.

FIG. 5 is a flowchart of process 500 for applying non-standard colorants. The process 500 may be performed by a computer, such as computer 120 in conjunction with an MFP, such as document processing device 110 in communication over a network, such as network 130. The process 500 starts at 505 and ends at 595. Many instances of the process 500 may run concurrently to provide services to a corresponding number of document processing devices. The process 500 may repeat or recur any number of times.

Figure 6:
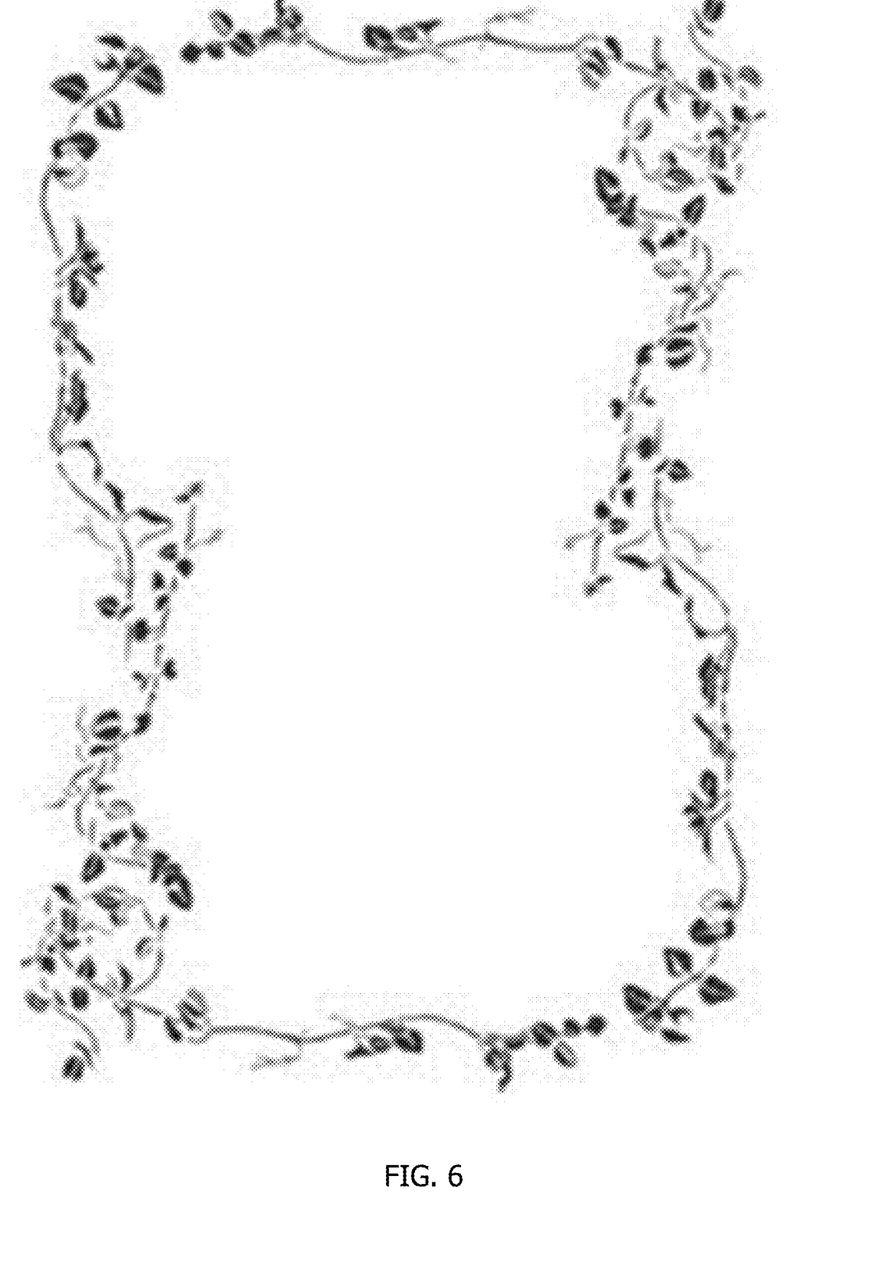
FIG. 6 shows the visual contents of an overlay file.

At 510, overlay data is created. This process may, for example, involve the launching of a word processor, graphics or image editing application, or other, similar application. Then, a user may create overlay data in various forms. The substance of the resulting documents may be text-based, a decorative border, a drop-shadow of another document, an outline, cross hatching or various other forms. An example of a decorative border overlay data appears in FIG. 6 which shows the visual contents of an overlay file.

Next, the overlay data is stored at 515. This overlay data may be in the form of a file, such as a word processor document file or image file stored at a known server or computer location. Alternatively, overlay data may be stored in a database accessible to an MFP or to a computer either on the MFP or computer or on a remote server. Similarly, overlay data may be stored on one MFP, but accessible to a series of interconnected MFPs over a network. The location where the overlay data is stored at 515 may be known to or automatically discoverable by a print driver operating on the MFP or computer.

Figure 7:
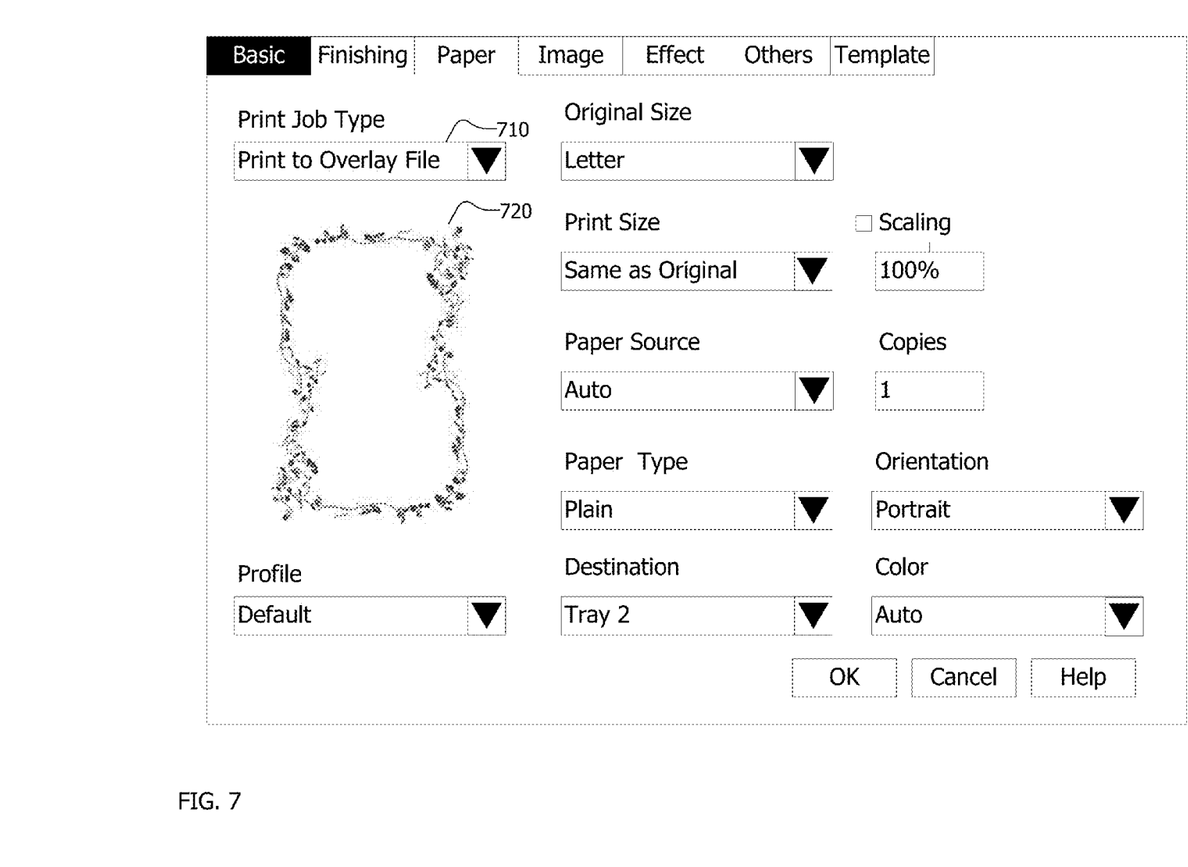
FIG. 7 is a user interface for storing an overlay file.

An example of overlay data storage is shown in FIG. 7 which shows a user interface for storing an overlay file. In this user interface, the overlay data is stored as a file by using a print-to-overlay function. This is shown as a selection of an output type in the print job type dropdown 710. A small preview of the contents of the overlay file are shown in preview 720 which corresponds to the actual overlay data shown in FIG. 6.

Next, an output document is created or accessed at 520. This output document is the document to which the overlay data will be applied. This document may pre-exist in that it may have been previously-created and stored at a known location. In such a case, the document is accessed and, likely, opened by a document editor of an appropriate type to access the output document.

Figure 8:
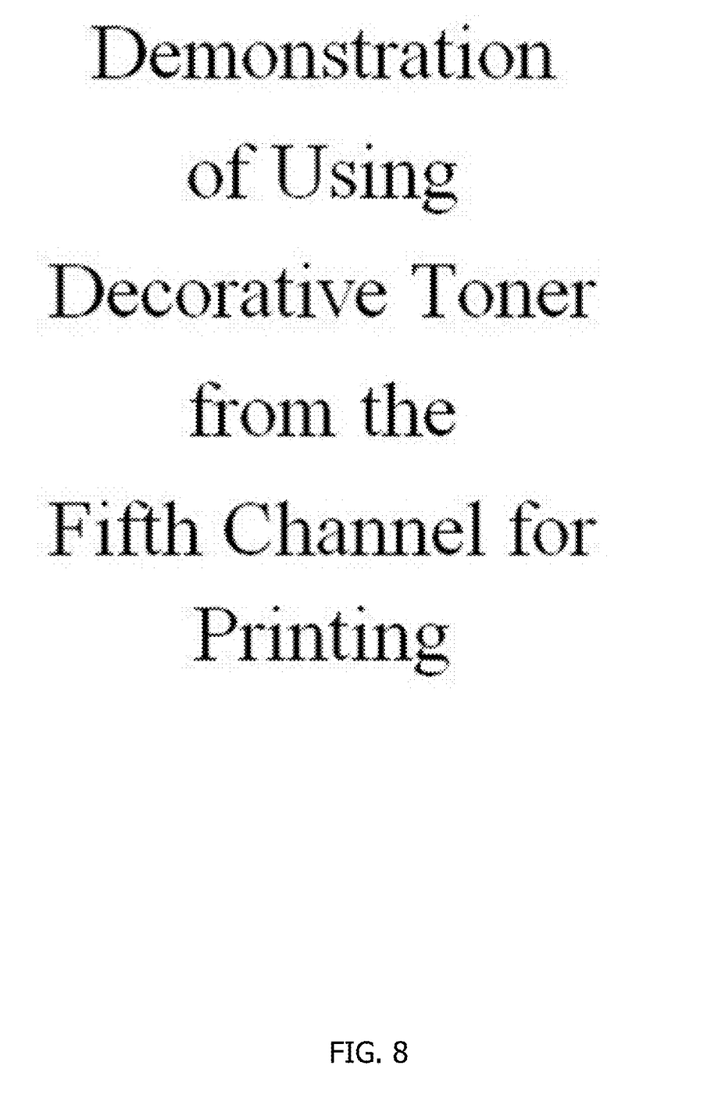
FIG. 8 shows the visual contents of a document to be printed.

If the document does not exist, an appropriate application to generate the output document is launched. For example, a word processor application may be launched and a user may interact therewith in order to create a suitable output document. Examples of applications include word processors, image editors, presentation editors, and web document editors. An example of an open output document appears in FIG. 8 which shows the visual contents of a document to be printed.

Next, the overlay data is identified at 525. This may involve the affirmative selection of an overlay file stored at a location on an MFP, a computer or a distinct server. Alternatively, a limited selection may be presented to a user based upon the above-described known or discovered storage location or from an overlay data database.

Figure 9:
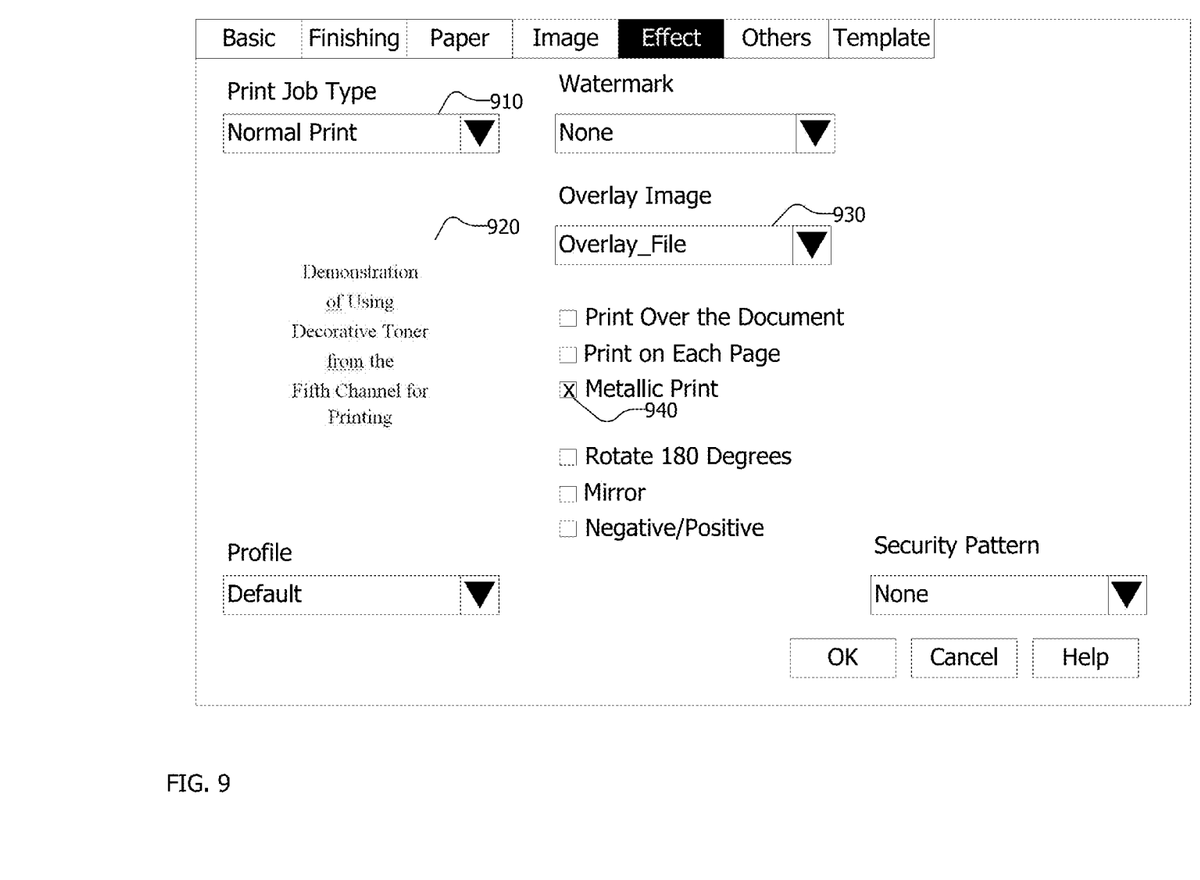
FIG. 9 is a user interface for printing with an overlay file.

This identification may be by selecting a file using a file browser or may take the form of a pre-determined listing of overlay data from which one may be selected. FIG. 9 shows a user interface for printing with an overlay file that is one example of a way in which such an identification may take place. The type of print job selected in the print job type dropdown 910 is a normal print job. A preview of the document to be printed is shown in the preview 920. Once the overlay data is selected, this preview may be updated with a depiction of the document including the overlay data.

The overlay image selected in the overlay dropdown 930 is "overlay_file" which is intended to be a generic name for a given set of overlay data. Other options, such as metallic print checkbox 940 may be used to indicate that the overlay data should be printed using metallic colorant. This may be implemented, for example, as a separate toner cartridge in an MFP.

After the overlay data is identified at 525, the printer driver converts the overlay data to grayscale at 530. This is because the overlay data will be printed with a single overlay colorant. As such, regardless of whether it appears in multiple colors, it will be represented as grayscale data. The grayscale data may then be used to determine the density of the overlay colorant to apply to a given area of the resulting printed page with darker grayscale associated with dense application of colorant and lighter grayscale associated with thin application of colorant. The grayscale data may be, for example, 8-bit, 1-channel grayscale.

Next, the page description language (or PostScript) document is written from the document data and overlay data at 535. When such page description language documents are written by a printer driver, the color data is divided according to the colorspace being employed by the printer. In a typical case using the CYMK colorspace, individual colorspace channels are prepared, one for each color, based upon the base document.

In the present invention, the document data is divided into the CYMK colorspaces, as is typical.

However, for the grayscale data (previously the overlay data) a color name keyword is added to the resulting page description language document that identifies the colorspace channel as an overlay channel. For example, the keyword of "GOLD_PRINT" may be used to flag or identify the overlay data as intended for a distinct overlay colorspace channel.

Next, the resulting PDL document is transmitted to the MFP 540 for output. In some cases, the MFP itself may be used to generate the PDL document from an output document and overlay data. In such a case, the functions shown in steps 510 through 540 may take place on the MFP. Similarly, a mobile device may be used in place of a computer in which steps 510 through 540 take place on the mobile device. Different user interfaces may be used in such cases as is appropriate to a given computing device.

Once the PDL document is received by the MFP, the PDL document is processed by the raster image processor (RIP) at 545. This may be performed, for example, by the RIP/PDL Interpreter 408 of FIG. 4. The RIP translates the page description language document into a series of colorspace channels for output by the MFP.

As the RIP process moves forward, the presence or non-presence of a color name keyword guides the RIP as to how to fill output buffers. If a color name keyword is present at 550, then that data represents overlay data and is rendered to an overlay buffer at 565. The color name keyword may be, for example, "GOLD_PRINT". If no color name keyword is present in the data, then the associated data is traditional colorspace channel data and is rendered to an appropriate standard buffer at 560, such as the buffer associated with one of the cyan, magenta, yellow or key colorspace channels.

Next, a determination is done to determine whether the render is complete at 570. If not, further color name keyword presence tests are performed at 550 and appropriate buffers are selected for each colorspace channel at 560 and 565. Once the render is complete at 570, the buffers may be output to the printing hardware of the MFP and the print operation is, thus, completed at 575.

Figure 10:
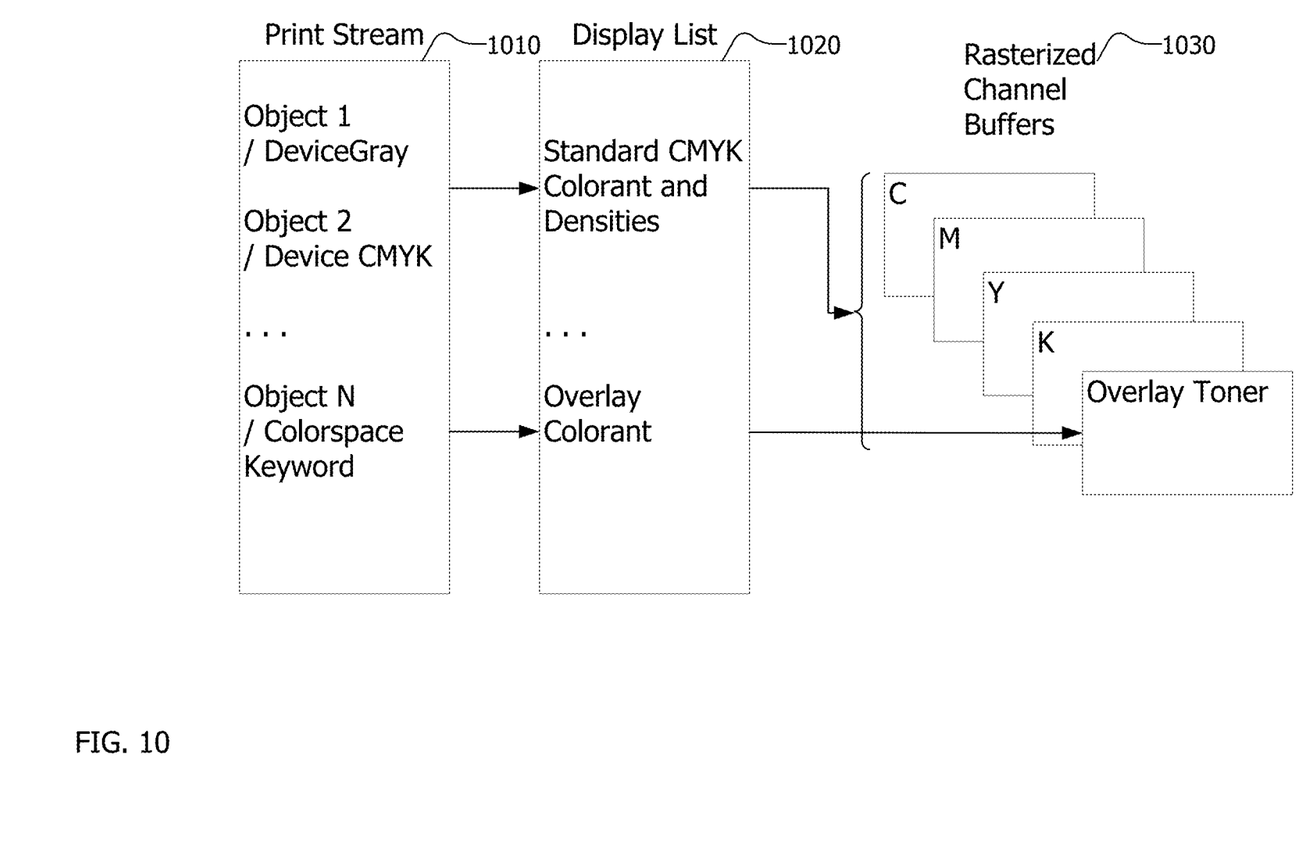
FIG. 10 is a detail of the print stream output dependent upon the data in the print stream.

FIG. 10 is a detail of the print stream output dependent upon the data in the print stream. Here, the print stream data 1010 may identify traditional grayscale data objects, or CMYK data objects. Those objects are not flagged with a colorspace keyword and, thus, are shown in a display list 1020 as using standard CMYK colorant and densities. The rasterized channel buffers 1030 are the channel buffers used in the traditional CMYK colorspace.

The print stream data 1010 also shows an object N with a color name keyword. This can be identified by the RIP/PDL interpreter as an overlay colorant in the display list 1020. Then, an appropriate overlay toner may be used when the overlay data is placed in the one of the rasterized channel buffers 1030 associated with overlay toner.

Figure 11:
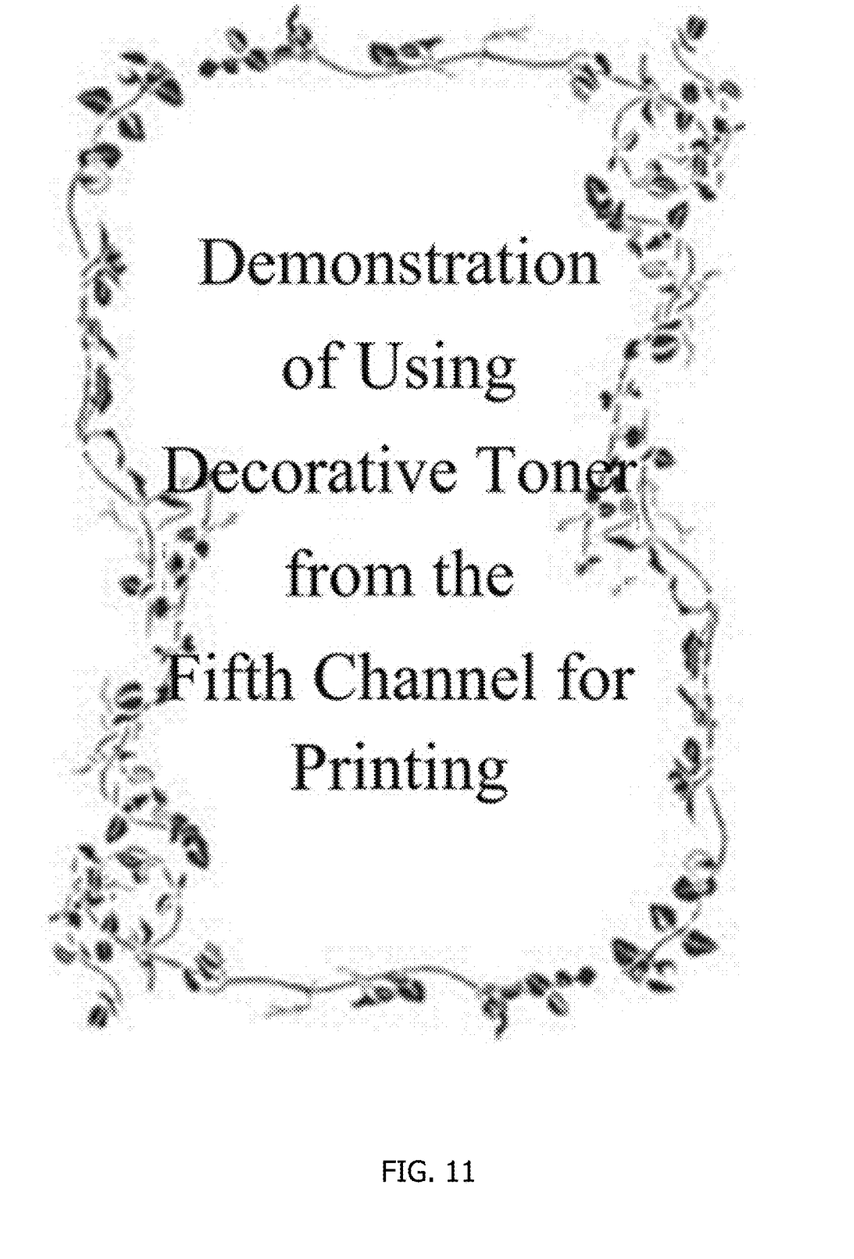
FIG. 11 shows the visual output of a print operation on a document with an alternative colorant overlay derived from an overlay file.

FIG. 11 shows the visual output of a print operation on a document with an alternative colorant overlay derived from an overlay file. The overlay data appears on top, because it is typically printed last, of the text from the output document. The overlay data is typically printed last because metallic colorant or toner is not particularly suitable for printing on by the traditional CYMK colors (or other, traditional colorspaces). Other overlay colorants such as rubberized, scented, gloss, tint, and similar colorants typically suffer from this problem. In some cases, the overlay data may be printed first or mid-print operation. In addition, printing these overlay colorants first can interfere with rollers or other mechanical aspects of the printing process such that it is desirable not to pass documents including overlay colorant repeatedly over rollers within an MFP.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A system, comprising a multifunction peripheral device including:
   a multifunction peripheral network interface for receiving a page description language document for output;
   a printer engine for:
   rendering standard colorspace channels in standard buffers as directed by the page description language document;
   identifying an overlay colorspace channel by identifying a pre-determined color name keyword associated with a specific overlay colorant in the overlay colorspace channel in the page description language document;
   rendering the overlay colorspace channel in an overlay buffer;
   printer hardware for completing a print operation by outputting the contents of the standard buffers using standard colorants and the overlay buffer using the overlay colorant.

2. The system of claim 1 further comprising a computing device including:
   a print driver including a raster image processor for:
   accepting identification of a document for output via the print operation;
   accepting identification of the overlay data for use in the print operation;
   converting the overlay data into grayscale data;
   generating the page description language document including data from the document divided into the standard colorspaces and the overlay colorspace, the overlay colorspace made up of the grayscale data and identified by the colorspace keyword; and
   a computer network interface for transmitting the page description language document to the multifunction peripheral device for output.

3. The system of claim 1, wherein the overlay colorant is metallic.

4. The system of claim 1, wherein the color name keyword identifies a colorant for use by the multifunction peripheral device as the overlay colorant.

5. The system of claim 2, wherein the printer engine printer hardware outputs the overlay colorant in a density determined by the grayscale data.

6. The system of claim 2, wherein the overlay data is generated before identification of the document and is stored as an overlay document.

7. The system of claim 2 wherein the grayscale data is 1-channel, 8-bit data representing a density of overlay colorant.

8. The system of claim 2 wherein the overlay data is used to add printable object definitions for the overlay data to the page description language document.

9. The system of claim 1 wherein the printer hardware further comprises:
   standard colorants, associated with a standard colorspace, stored within colorant chambers for outputting the contents of the standard buffers;
   an overlay colorant, not associated with any standard colorspace, stored within a distinct colorant chamber for outputting the contents of the overlay buffer; and
   print rollers for outputting the standard colorants and the overlay colorant onto a printed page in a desired order.

10. The system of claim 1 wherein the printer hardware further comprises memory sufficient to store data for both the standard buffers and the overlay buffer.

11. The system of claim 2 wherein the color name keyword identifies a non-standard colorant.

12. A method for enabling overlay printing, comprising:
    accepting identification of a document for output via a print operation;
    accepting identification of overlay data for use in the print operation;
    converting the overlay data into grayscale data;
    generating a page description language document including data from the document divided into standard colorspace channels and an overlay colorspace channel, the overlay colorspace channel made up of the grayscale data and identified by a colorspace keyword associated with a specific overlay colorant;
    rendering the standard colorspace channels in standard buffers as directed by the page description language document;
    identifying the overlay colorspace channel using the colorspace keyword within the page description language document;
    rendering the overlay colorspace channel in an overlay buffer; and
    completing the print operation by outputting the contents of the standard buffers using standard colorants and the overlay buffer using the overlay colorant.

13. The method of claim 12, wherein the color name keyword identifies a colorant for use by the multifunction peripheral device as the overlay colorant.

14. The method of claim 12, wherein the printer engine printer hardware outputs the overlay colorant in a density determined by the grayscale data.

15. The method of claim 12, wherein the overlay data is generated before identification of the document and is stored as an overlay document.

16. The method of claim 12 wherein the grayscale data is 1-channel, 8-bit data representing a density of overlay colorant.

17. The method of claim 12 wherein the overlay data is used to add printable object definitions for the overlay data to the page description language document.

18. The method of claim 12 wherein the color name keyword identifies a non-standard colorant.

19. A system, comprising:
a print driver for:
accepting identification of a document for output via a print operation;
accepting identification of overlay data for use in the print operation;
converting the overlay data into grayscale data;
generating a page description language document including data from the document divided into standard colorspace channels and an overlay colorspace channel, the overlay colorspace channel made up of the grayscale data and identified by a color name keyword associated with a specific overlay colorant; and
a multifunction peripheral device for:
rendering the standard colorspace channels in standard buffers as directed by the page description language document;
identifying the overlay colorspace channel using the colorspace keyword within the page description language document;
rendering the overlay colorspace channel in an overlay buffer; and
completing the print operation by outputting the contents of the standard buffers using standard colorants and the overlay buffer using the overlay colorant.

20. The system of claim 19 wherein the color name keyword identifies a non-standard colorant.

* * * * *